United States Patent
Leissner et al.

(10) Patent No.: US 6,821,363 B1
(45) Date of Patent: Nov. 23, 2004

(54) PROCEDURE FOR HARDENING AT LEAST ONE SURFACE OF A WALL OF A COMPONENT AND DEVICE FOR ITS EXECUTION

(75) Inventors: Hans-Jürgen Leissner, Remscheid (DE); Peter Schulte, Wuppertal (DE); Waldemar Gezarzick, Remscheid (DE); Richard Dyksik, Remscheid (DE)

(73) Assignee: Elotherm GmbH, Remscheid (DE)

( * ) Notice: Subject to any disclaimer, the term of this patent is extended or adjusted under 35 U.S.C. 154(b) by 0 days.

(21) Appl. No.: 10/049,262

(22) PCT Filed: May 5, 2000

(86) PCT No.: PCT/EP00/04020

§ 371 (c)(1),
(2), (4) Date: Jun. 24, 2002

(87) PCT Pub. No.: WO01/09395

PCT Pub. Date: Feb. 8, 2001

(30) Foreign Application Priority Data

Jul. 30, 1999 (DE) ......................................... 199 35 884

(51) Int. Cl.⁷ ............................. C21D 1/10; C21D 1/667
(52) U.S. Cl. ....................... 148/570; 148/574; 266/104; 266/113; 266/124; 266/127
(58) Field of Search ................................ 148/567, 570, 148/574; 266/104, 113, 124, 127

(56) References Cited

U.S. PATENT DOCUMENTS

| 4,375,997 A | | 3/1983 | Matz |
| 4,531,987 A | * | 7/1985 | Pfaffmann et al. |
| 4,786,772 A | * | 11/1988 | Umemoto et al. .......... 266/129 |
| 6,270,595 B1 | * | 8/2001 | Takayama et al. .......... 148/570 |

FOREIGN PATENT DOCUMENTS

| DE | 965 816 C | 6/1957 |
| DE | 196 24 499 A | 1/1997 |
| EP | 0 070 409 A | 1/1983 |
| JP | 60 002627 A | 5/1985 |

* cited by examiner

Primary Examiner—George Wyszomierski
(74) Attorney, Agent, or Firm—Proskauer Rose LLP

(57) ABSTRACT

A procedure for hardening at least one surface (S, L) of a wall (W) of a component (T), in which the surface to be hardened (S, L) is inductively heated with at least one inductor (2), in which liquid is filled into a gap (P) between the surface to be hardened (S, L) and the inductor (2) while heating the surface to be hardened (S, L), in which the side (AS) of the wall (W) opposite the side (IS) of the wall (W) provided with the surfaces to be hardened (S, L) is sprayed with liquid while heating the surface to be hardened (S, L), and in which at least one liquid jet (KI) is aimed at a zone (RZ) of the wall (W) that is adjacent to the surface to be hardened (S, L), and to be precluded from heating by the inductor (2). The procedure according to the invention makes it possible to tailor the hardening of at least one surface to the respective requirements, even on the walls of complexly shaped components with a small wall thickness.

18 Claims, 4 Drawing Sheets

US 6,821,363 B1

PROCEDURE FOR HARDENING AT LEAST ONE SURFACE OF A WALL OF A COMPONENT AND DEVICE FOR ITS EXECUTION

BACKGROUND OF THE INVENTION

The invention relates to a procedure for hardening at least one surface of a wall of a component and a device specially suited for executing this procedure.

The problem when hardening surfaces on walls of components is that the objective is to achieve the desired quality of hardening on the one hand, while preventing the wall in question from losing the toughness required for the respective application of the component. Therefore, it is necessary to prevent the wall from becoming heated through while heating the surfaces to be hardened.

This can be accomplished during the use of inductors, which heat the surfaces to be hardened by inducing an electromagnetic field, by setting the penetration depth of the field generated by the inductor according to the required depth of hardening in the area of the surface to be hardened. However, this process presumes that a sufficient wall thickness is present in the area of the surface to be hardened. Otherwise, the wall cannot be prevented from heating through, and hence hardened through due to heat migration.

Therefore, when hardening of relatively thin-walled components, a change has been made in practice to cooling with liquid the wall lying opposite the side of the wall having the surfaces to be hardened, By suitably metering the cooling liquid stream, the penetration depth of the heat generated in the wall by the inductor, and hence the depth of hardening in the area of the surface to be hardened, can be set even in thinwalled components.

Special requirements are placed on the hardening of surfaces on the walls of a component with respect to front-drive motor vehicles, in which the drive torque is transferred via sliders, which sit moveably in a so called "tripod". Such a tripod is shaped like a bowl, and exhibits several supporting and running surfaces angled relative to each other and extending in a longitudinal direction, axially parallel to the longitudinal axis of the tripod. The sliders arc guided on these supporting and running surfaces. At the same time, the supporting surfaces absorb the torque transferred by the sliders. To be able to withstand this load, the supporting and running surfaces must be hardened. At the same time, the toughness of the wall material must be retained, despite the hardening of the surfaces, so that the tripod can withstand the alternating torque loads while driving the vehicle.

The object of the invention is to provide a procedure of the kind described above, which enables a hardening of at least one surface adapted to the respective requirements, even on the walls of complexly shaped components with a small wall thickness. In addition, a device suitable for executing this procedure is to be specified.

SUMMARY OF THE INVENTION

This object is achieved in terms of the procedure for hardening at least one surface of a wall of a component by virtue of the fact that the surface to be hardened is inductively heated with at least one inductor, that a liquid is filled in a gap present between the surface to be hardened and the inductor while heating the surface to be hardened, that the side of the wall lying opposite the side of the wall provided with the surfaces to be hardened is applied with liquid as the surface to be hardened is heated, and that at least one liquid jet is aimed at a zone of the wall adjacent to the surface to be hardened, which is to be prevented from being heated by the inductor.

According to the invention, not only is the side of the wall lying opposite the side of the wall provided with the surface to be hardened wetted with cooling liquid, but liquid is additionally aimed at the zone of the side of the wall that borders the surface to be hardened, and is not to be encompassed by hardening. The additional liquid jet transports away the heat that arises in the zone to be excluded from heating due to the influence of the induced electromagnetic field. In this way, not only the penetration depth of the hardening zone can be specifically predetermined in the area of the surfaces to be hardened, also its surface expansion can.

Therefore, the procedure according to the invention makes it possible to form precisely delineated hardening zones, whose expansion and depth are adapted to the respective structural requirements and loads of the component provided with the hardened surfaces. For example, a progression of the edge of the hardened surfaces established precisely based on the orientation and progression of the liquid jets can be generated by virtue of the fact that the liquid jets are each aimed at the wall provided with the surface to be hardened in sections or in a specific sequence, and transport away the heat arising there. In this way, for example, a sufficiently soft wall material can be provided at precisely the locations where deformation is to be executed after hardening the wall surfaces for structural or assembly-related reasons.

At the same time, because the gap between the inductor and surface to be hardened is filled with liquid, the field generated by the inductor penetrates into the wall to be heated in a uniform fashion. In this way, a homogeneous processing result can be ensured, even though streams of cooling liquid are continuously supplied while heating the surfaces that would otherwise disrupt the uniformity of heating.

The procedure according to the invention is particularly suited for hardening surfaces on walls of those components in which the wall envelops an interior space, and the surfaces to be hardened are arranged on the side of the wall allocated to the interior space. The uniform filling of the gap between the inductor and surface to be hardened can be ensured in a particularly simple manner in these types of components. Additionally in structural members designed like this, several surfaces can be hardened simultaneously. This also applies in particular in cases where at least two adjacent surfaces angled relative to one another are each hardened at the same time, as is the case with respect to the tripods described at the outset, for example.

One particularly intensive, short-term inductive heating of the surface to be hardened limited to a specific, narrowly delineated surface and depth can be achieved by generating the electromagnetic field at high frequency. In this way, the inductive heating of the surfaces to be hardened can advantageously take place at a frequency of up to 80 kHz, for example.

A device particularly well-suited for executing the procedure according to the invention is equipped with an inductor for heating the surface to be hardened, a liquid feed line, through which liquid gets into the gap between the inductor and the surface to be hardened, a first sprayer, which aims at least one liquid jet at the side of the wall lying opposite the side of the wall provided with the surface to be hardened, and with at least one additional sprayer, which aims the liquid jet at the zone of the wall to be precluded from hardening.

In this case, it is particularly beneficial if the sprayer whose jet is aimed at the zone to be precluded from hardening be carried by the inductor. This type of design of the device according to the invention can be realized with a low technical outlay, and yields a compact shape for the required structural members. The latter is always of particular importance in cases where only a little space is available inside the device for the inductor and sprayers.

BRIEF DESCRIPTION OF THE DRAWINGS

Additional advantageous developments of the procedure according to the invention and device suitable for its execution are given in the subclaims, and shall be described in greater detail below in conjunction with an embodiment based on the drawing. Shown on:

DETAILED DESCRIPTION OF THE INVENTION

Figure 1:
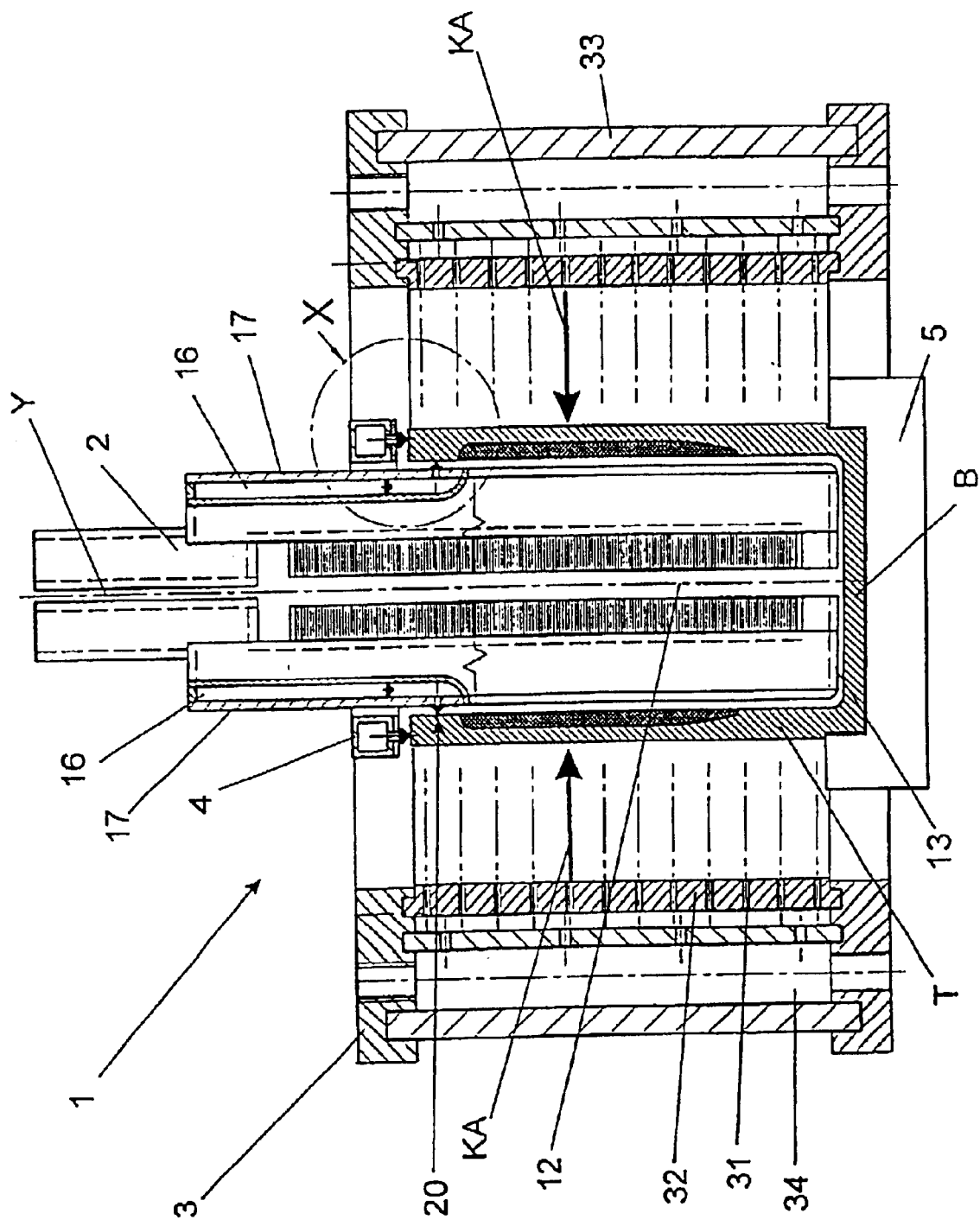
FIG. 1 is a device for hardening the supporting and running surface of a tripod, longitudinal section.
Figure 2:
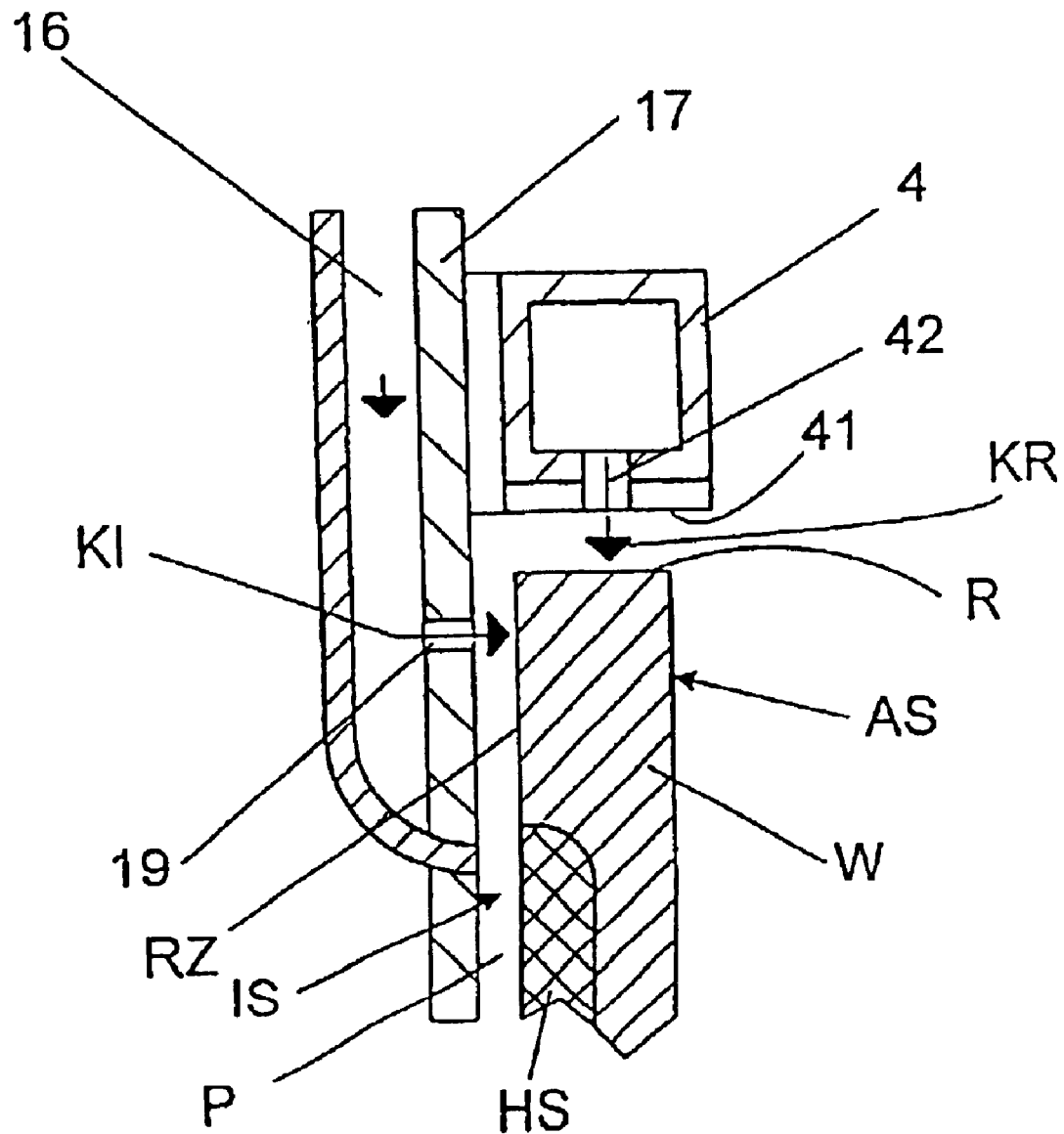
FIG. 2 is a section "X" of FIG. 1, magnified scale.

The device 1 for hardening the supporting surfaces S and the running surfaces L of a tripod T exhibits an inductor 2, an outside sprayer 3, a front surface sprayer 4 and a work piece holder 5.

The tripod T is shaped like a bowl, and exhibits a wall W that envelops an interior space I and stands on a floor B. Groove-like guide paths F for the sliders (not shown) are incorporated in the wall W proceeding out from the interior space 1, each offset by 120° with a star-shaped cross section, and extend axially parallel to the longitudinal axis X of the tripod T. The corner areas E1, E2 of these guide paths F each incorporate a running surface L and a supporting surface S at a right angle to each other in cross section, wherein the supporting surface S is curved, reflecting the shape of the sliders (not shown).

The outer shape of the inductor 2 that can be lifted and lowered in its longitudinal direction is adapted to the shape of the interior space I of the tripod T in such a way that the inductor 2 engages the guide paths F of the tripod T with a radially projecting section. In this case, the dimensions of the inductor 2 are such that a continuous gap P is present between the outer border 7 of the inductor 2 and the inside IS of the wall W of the tripod T with the inductor 2 introduced into the tripod T.

The corner regions of the projecting sections of the inductor 2 allocated to the corner regions E1, E2 of the guide paths F are each formed by a heating resistor 10 with the required sheeting 11. In addition, a supply pipe 12 for cooling liquid is positioned coaxially to the longitudinal axis Y of the inductor 2. The supply pipe 12 is connected with a liquid feed (not shown), and empties on the front side 13 of the inductor 2. Liquid additionally exits into the free paces IS remaining between the heating resistors 10 or sheeting 11 via channels 14 radially branching from the supply pipe 12.

Incorporated in the upper part of the inductor 2 in each of the radially projecting sections of the inductor 2 is a channel 16, which is connected with the liquid feed (not shown), just as the supply pipe 12. In this case, the channels 16 are each allocated to the supporting surfaces S of the guide paths F of the tripod T. Spheroidised into the outer wall 17 of the channels 16 are radially outwardly projecting outlet holes 19, which are each oriented toward the edge zone RZ of the inside IS of the wall W of the tripod T situated between the upper edge R of the wall W and the upper edge of the supporting surface S to be hardened with the inductor 2 introduced into the tripod T. In this way, a sprayer 20 is formed on the inductor 2, which aims liquid jets KI at zones RZ of the tripod T that are directly adjacent to the surfaces to be hardened and to be precluded from hardening.

The outside sprayer 3 is ring-shaped, and its inner wall 32 provided with uniformly arranged outlet holes 31 envelops the tripod T standing on the work piece holder 5. Situated between the outer wall 33 and inner wall 32 of the outside sprayer 3 is a channel 34, which is also connected with the liquid feed (not shown).

Figure 3:
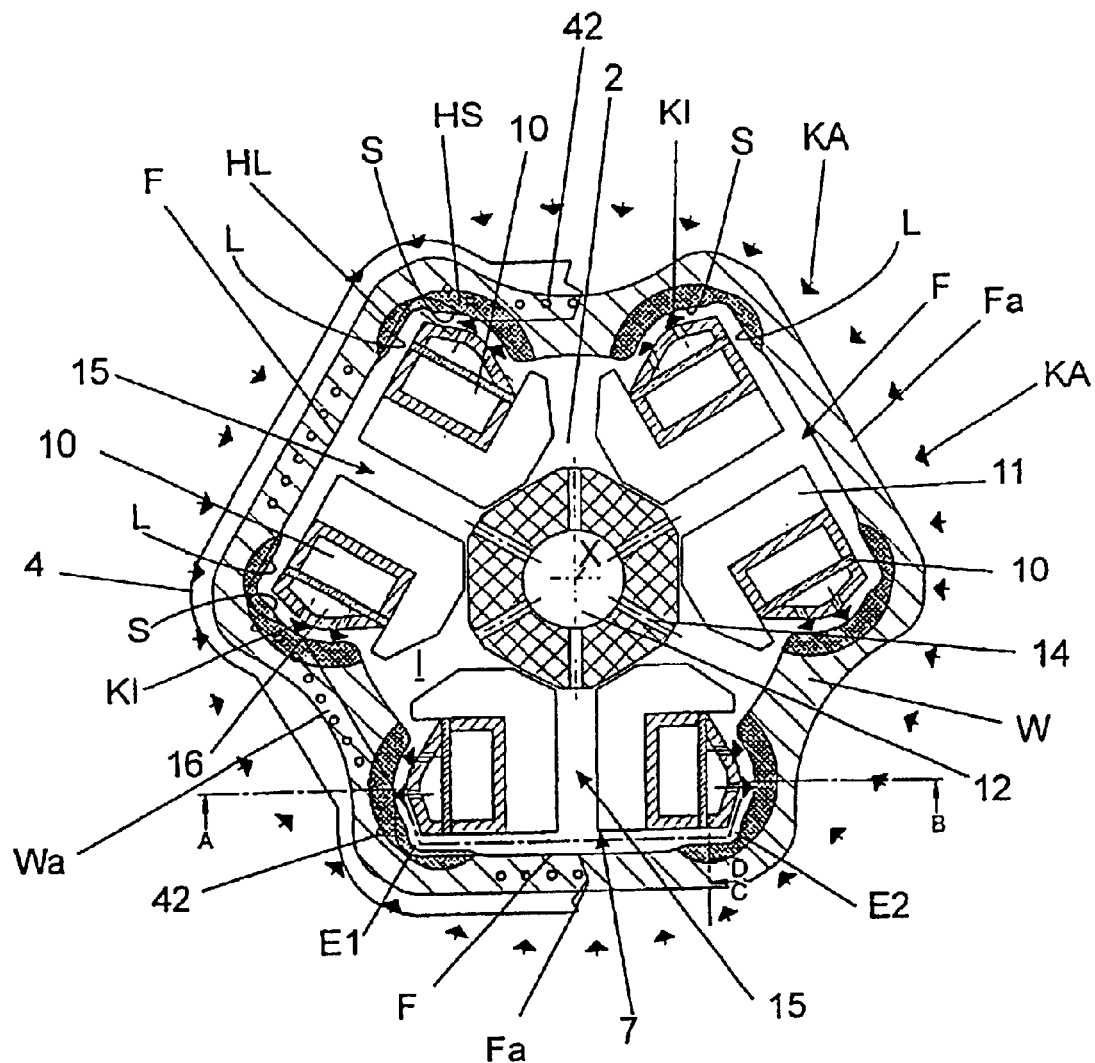
FIG. 3 is the device according to FIG. 1, cross section.
Figure 4:
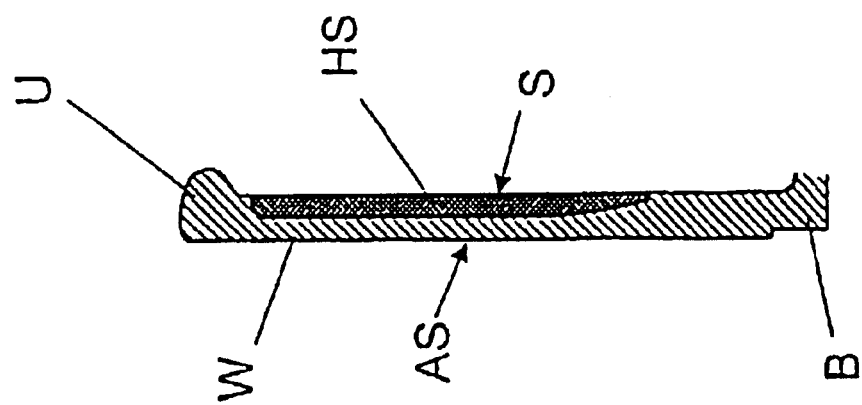
FIG. 4 is the tripod in a section corresponding to the A–B line penciled in on FIG. 3.
Figure 5:
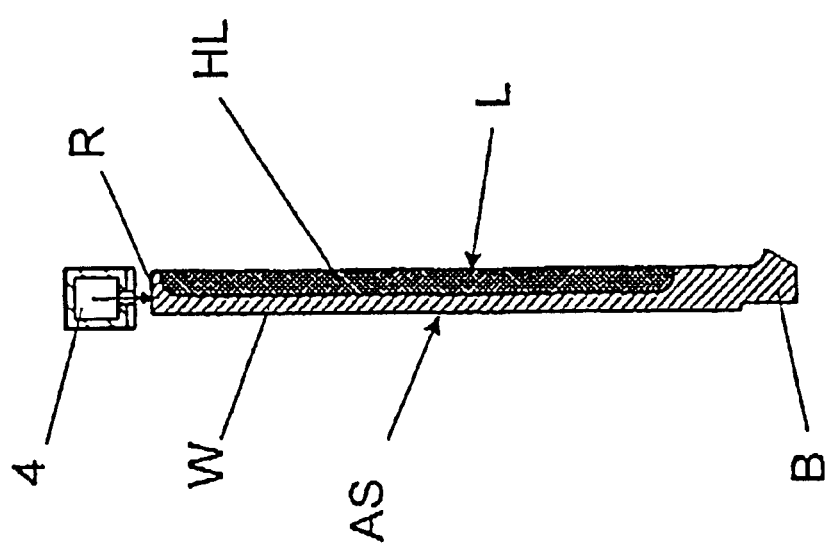
FIG. 5 is the tripod in a section corresponding to the C–D line penciled in on FIG. 3.
Figure 6:
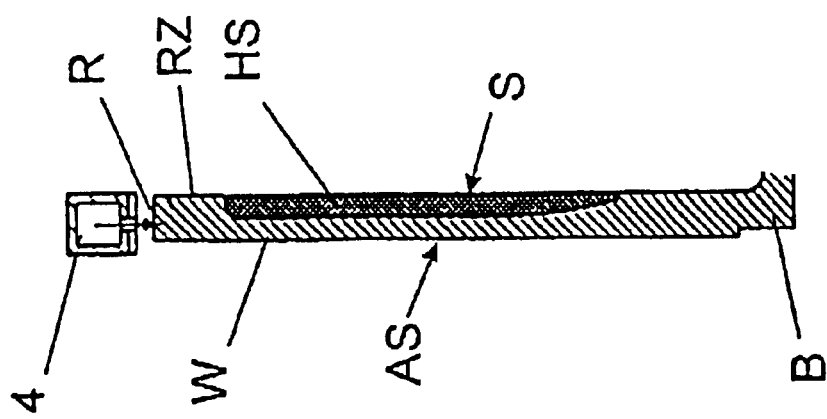
FIG. 6 is the tripod after upsetting deformation that takes place following the hardening of the supporting and running surfaces, in a section corresponding to the A–B line penciled in on FIG. 3.

The front surface sprayer 4 is carried by the inductor 2, so that it can be lowered or lifted by the latter in the direction of tripod T. The shape of the front surface sprayer 4 is adapted to the progression of the upper edge R of the tripod T in such a way that its lower face 41 runs adjacent to the front face of the upper edge R of the tripod T. Outlet holes 42 oriented toward the edge R of the tripod T are respectively spheroidised in the front surface 41 in the sections of the front surface sprayer 4 that are allocated to the supporting surfaces S, the wall sections Wa between the guide paths F and the unhardened wall sections Fa of the guide paths F between the running paths L. (For purposes of clarity, only half the front surface sprayer 4 is shown on FIG. 3.)

In order to harden the supporting surfaces S and running surfaces L of the tripod T, the inductor 2 is lowered into the interior space I of the tripod T. In this lowered position, the outlet of supply pipe 12 is located a slight distance away from the floor B of the tripod T. The front surface sprayer 4 is also spaced apart from the edge R of the tripod T. The outlet nozzles of the sprayer 20 are oriented toward the section of the edge area RZ of the tripod T respectively oriented to them.

Subsequently, the outside sprayer 3, the front surface sprayer 4 and the sprayer 20 along with the supply pipe 12 are impacted with cooling liquid from the liquid feed (not shown), so that cooling liquid jets KA cool the outside AS of the wall W, cooling liquid jets KR cool the sections of the face allocated to the outlet holes 42 of the front surface sprayer 4 in the area of the upper edge R of the wall W, and cooling jets KI cool the edge zones RZ of the wall W of the tripod T immediately adjacent to the supporting surfaces S to be hardened. The cooling liquid exiting the outlet of the supply pipe 12 and the channels 14 branching from the supply pipe 12 fills the gap 8 present between the wall W and the inductor 2.

The supporting and running surfaces S, L of the guide paths F are then inductively brought to the temperature necessary for the desired heating through exposure to the electromagnetic field generated by the heating resistors 10. After heating is completed, the heated running surfaces are quenched by the cooling liquid stream exiting the supply pipe 12. The hardening zone HL then present in the area of the running surfaces L extends in a longitudinal direction up to under the edge R of the wall W, since no cooling jets KI have been sent out by the sprayer 20 in this area. By contrast, in the area of the supporting surfaces S, the edge zone RZ remained unhardened between the accompanying hardening zone HS and the edge R, since cooling via the cooling liquid jets KI was active in this zone during the heating of the supporting and running surfaces S, L. Due to the cooling of the outside AS of the wall W, the depth t of both hardening zones HL, HS is limited to roughly half the wall thickness of the wall W.

After the sliders (not shown) have been mounted in the tripod T, the tripod T is subjected to upsetting deformation in a device (also not shown), as a result of which a bead U projecting inside the interior space I of the tripod T is generated in the area of the unhardened edge zone RZ. This bead prevents the sliders mounted in the tripod T from falling out.

KEY

1 Hardening device
2 Inductor
3 Outside sprayer
4 Front surface sprayer
5 Work piece holder
7 Outer delineation of inductor 2
10 Container
11 Sheeting
12 Supply pipe
14 Channels
13 Front side of inductor 2
15 Free spaces
16 Channels
17 Outer wall of channels 16
19 Outlet holes
20 Sprayer
31 Outlet holes
32 Inner wall
33 Outer wall
34 Channel
41 Front surface
42 Outlet holes
AS Outside of wall W
B Floor
E1,E2 Corner areas
F Guide paths
Fa Wall sections
HL,HS Hardening zones
I Interior space
IS Inside of wall W
KA Cooling liquid jets
KI Liquidjets
KR Cooling liquid jets
L Running surfaces
P Gap
R Edge
RZ Edge zone
S Supporting surfaces
T Tripod
t Depth of hardening zones HL, HS
U Bead
W Wall
Wa Wall sections
X Longitudinal axis of tripod T
Y Longitudinal axis of inductor 2

What is claimed is:

1. A procedure for hardening at least one surface (S, L) of a wall (W) of a component (T)

in which the surface to be hardened (S, L) is inductively heated with at least one inductor (2), in which, while heating the surface to be hardened (S, L), a liquid is filled into a gap (P) present between the surface to be hardened (S, L) and the inductor (2), in which, during the heating of the surfaces (S, L) to be hardened, a liquid jet (KA) emitted from a sprayer (3) is aimed at the side (AS) of the wall (W) lying opposite the side (IS) of the wall (W) provided with the surfaces to be hardened (S, L), and in which at least one liquid jet (KI) emitted from an additional sprayer (20) carried by the inductor (2) is aimed at a zone (RZ) of the wall (W) that is adjacent to the surface to be hardened (S, L), and to be precluded from heating by the inductor (2).

2. The procedure according to claim 1, wherein the wall (W) envelops an interior space (1), and that the surface to be hardened (S, L) is arranged on the side (IS) of the wall (W) allocated to the interior space (I).

3. The procedure according to claim 1, wherein the component (T) is shaped as a bowl.

4. The procedure according to claim 1, wherein at least two adjacent surfaces (S, L) angled relative to each other are hardened at the same time.

5. The procedure according to claim 1, wherein the zone (RZ) of the wall (W) precluded from heating is arranged between an edge (R) of the wall (W) and the surface to be hardened (S, L).

6. The procedure according to claim 5, wherein liquid is applied to the edge (R) of the wall (W) while heating the surfaces to be hardened (S, L).

7. The procedure according to claim 1, wherein the component (T) is subjected to upsetting deformation after hardening the surfaces to be hardened (S, L), as a result of which a bead (W-V is formed in the area of the zone (RZ) precluded from hearing.

8. The procedure according to claim 7, wherein the wall (W) envelops an interior space (I), and wherein the bead (U) is oriented in the interior space (I).

9. The procedure according to claim 1, wherein the surfaces to be hardened (S, L) are inductively heated at a frequency of up to 80 kHz.

10. A device for executing the procedure according to claim 1, with an inductor (2) for heating the surface to be hardened (S, L), with a liquid feed (12), through which liquid gets into the gap (P) between the inductor (2) and the surface to be hardened (S, L), with a first sprayer (3), which aims at least one liquid jet (KA) on the side (AS) of the wall (W) lying opposite the side (IS) of the wall (W) provided with the surface to be hardened (S, L), and with at least one additional sprayer (20), which is carried by the inductor (2), and aims a liquid jet (KI) at the zone (RZ) of the wall (W) that is adjacent to the surface to be hardened (S, L) and to be precluded from hardening.

11. The device according to claim 10, wherein the liquid feed is designed as a liquid line (12) arranged in the inductor (2) that ends on one side (13) of the inductor (2).

12. The device according to claim 11, wherein the liquid line (12) runs axially parallel and closely adjacent to the heating resistors (10) of the inductor (2).

13. The device according to claim 12, wherein the liquid line (12) is arranged coaxially to the longitudinal axis (Y) of the inductor (2).

14. The device according to claim 12, wherein the liquid line (12) ends on a front side (13) of the inductor (2).

15. The device according to claim 14, wherein a channel (16) is incorporated in the inductor (2) which supplies the sprayer (20) with liquid.

16. The device according to claim 10, wherein the inductor (2) exhibits several heating resistors (10) arranged axially parallel to a longitudinal axis (Y).

17. The device according to claim 10, wherein an additional sprayer (4) aims a liquid jet (KR) at an edge (R) of the wall (W) provided with the surfaces to be hardened (S, L).

18. The device according to claim 17, wherein the additional sprayer (4) is coupled with the inductor (2).

* * * * *